Aug. 11, 1953     F. BUDRECK     2,648,256
REARVIEW MIRROR STRUCTURE
Filed Jan. 19, 1951
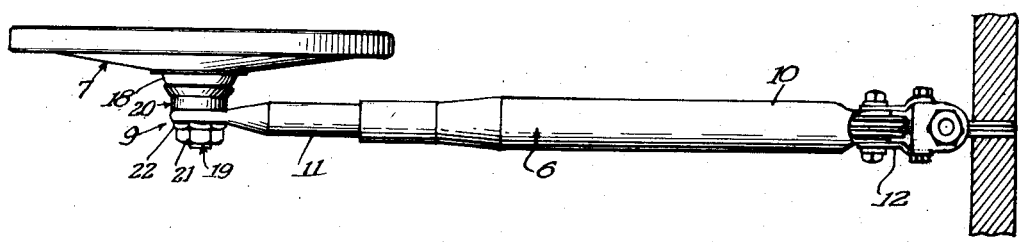
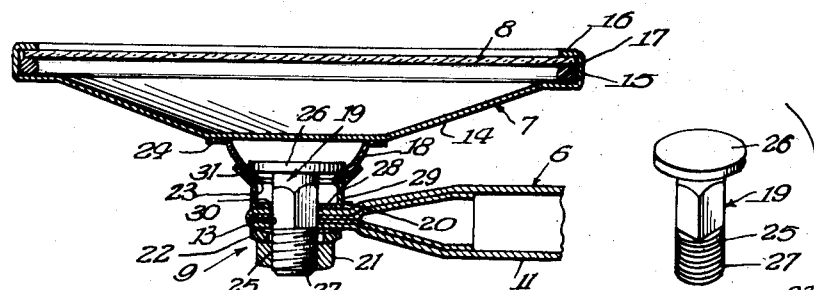
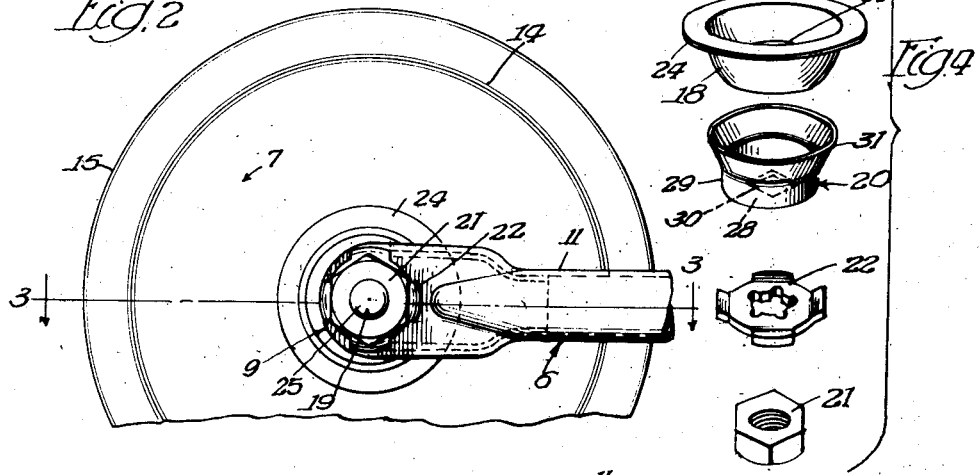
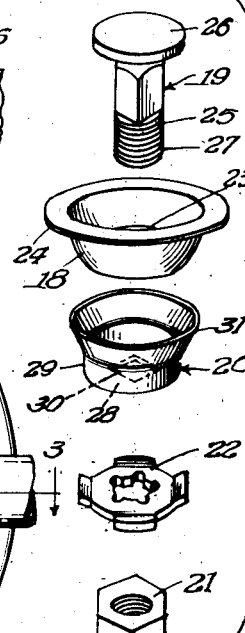
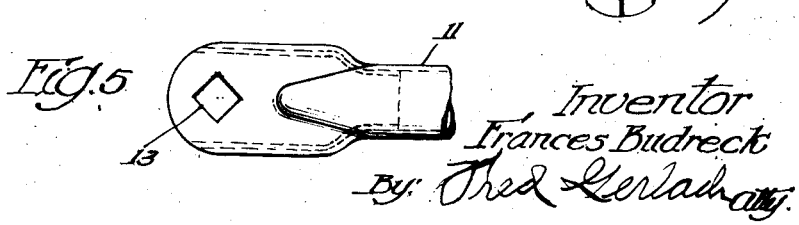
Inventor
Frances Budreck
By: Fred Gerlach atty.

Patented Aug. 11, 1953

2,648,256

UNITED STATES PATENT OFFICE 2,648,256

REARVIEW MIRROR STRUCTURE

Frances Budreck, Chicago, Ill., assignor to Monarch Tool & Machinery Co., Chicago, Ill., a corporation of Illinois Application January 19, 1951, Serial No. 206,795

2 Claims. (Cl. 88—98)

The present invention relates generally to rear view mirror structures. More particularly the invention relates to that type of rear view mirror structure which is designed and adapted for disposition on the outside of the body of a truck or like vehicle, affords the driver of the truck an opportunity while driving forwards to view objects behind or rearwards of the truck, and as its components comprise an outwardly extending bracket-like arm with means at its inner end for attachment to the truck body, a stamped metal cup-shaped shell at the outer end of the arm and in the form of a forwardly bulged crosswall and a continuous rearwardly extending side wall, a resiliently mounted mirror plate extending across the space within the continuous side wall of the shell, and a universal joint between the central portion of the shell cross wall and the outer end of the arm for permitting the shell together with the mirror plate to be angularly adjusted to a limited extent relatively to the arm.

As evidenced by pending United States patent application Serial No. 183,516, filed by me on September 7, 1950, and entitled "Rear View Mirror Structure," it has heretofore been proposed in connection with a rear view mirror structure of the aforementioned type to employ as the universal joint between the cup-shaped shell and the outer end of the bracket-like arm the following parts: (1) a hollow substantially hemispherical one-piece stamped metal member which is disposed adjacent to, and has the apex portion thereof projecting away from, the central portion of the shell crosswall, embodies a circular opening in its apex portion and has at its outer marginal portion an outwardly extending flange in abutting and welded relation with the outer surface of the central portion of the shell crosswall; (2) a bolt which consists of an elongated screw threaded shank of circular cross section and an enlarged head at one end of the shank, extends loosely through the opening of the apex portion of the hollow member, is arranged so that the head thereof is disposed wholly within such member, and has the other end of its shank extending through a circular hole in the outer end of the arm and provided with a pair of clamp nuts for fixedly connecting it to the outer end of the arm; (3) inner and outer cup-shaped washers which are mounted on, and extend around, the head equipped end of the shank of the bolt and are arranged in straddled relation with the portion of the hollow member that defines the center opening; and (4) a spiral compression spring which surrounds the central portion of the shank of the bolt, is interposed between the outer cup-shaped washer and the innermost clamp nut, and serves yieldingly to clamp the inner and outer cup-shaped washers in straddled relation with the apex portion of the hollow member. In practice it has been found that a rear view mirror structure having a universal joint of the aforementioned character is subject to certain objections even though it fulfills its intended purpose. In the first place, because the shank of the bolt is of circular cross section and extends through a circular hole in the outer end of the bracket-like arm there is a marked tendency for the bolt in response to normal vibration to which the arm is subjected in connection with driving of the truck to become loose and to turn relatively to the arm. In the event that the bolt turns relatively to the arm the turning movement is imparted to the cup-shaped shell through the medium of the inner and outer cup-shaped washers and the hollow substantially hemispherical member on the central portion of the shell crosswall with the result that the angular position of the shell and mirror plate is disturbed and it is necessary for the driver of the truck to readjust the angular position of the shell in order to obtain proper rearward vision by way of the mirror plate. Secondly, the arrangement and location of the compression spring for maintaining the inner and outer cup-shaped washers in clamped relation with the apertured portion of the hollow member necessitates the use of a comparatively long bolt and disposition of the outer cup-shaped washer at an appreciable distance from the outer end of the bracket-like arm. By requiring the use of a long bolt and disposition of the outer cup-shaped washer at an appreciable distance from the outer end of the arm the vibration to which the arm is subjected in connection with operation of the truck is imparted to the shell in an amplified manner and hence it is difficult to use the mirror plate to see rearwards and the mirror plate is likely to crack and require costly replacement. A third objection to a universal joint of the aforementioned type is that the bolt is capable of turning relatively to the outer end of the bracket-like arm and hence difficulty is encountered in tightening the clamp nuts for connecting the rear end of the shank of the bolt to the outer end of the arm.

The primary object of this invention is to provide a rear view mirror structure which is an improvement upon, and has certain inherent advantages over, previously designed structures including that forming the subject matter of said patent application Serial No. 183,516, and is characterized by the fact that the universal joint thereof embodies a novel design and arrangement of parts whereby the objections heretofore mentioned are obviated.

Another object of the invention is to provide a rear view mirror structure of the type and character under consideration in which the outer cup-shaped washer of the universal joint comprises a flat crosswall and a cylindrical side wall and is so arranged that its crosswall abuts directly against the outer end of the bracket-like arm, and the head equipped end portion of the bolt is polygonal in cross section and extends through correspondingly polygonal registering holes in the flat crosswall of the outer cup-shaped washer and the outer end of the arm. With this particular construction or arrangement the bolt and outer cup-shaped washer are positively held against turning relatively to the arm, and the cup-shaped shell with the mirror plate therein is precluded from rotating bodily out of its preadjusted position in the event of loosening of the clamp nut means on the bolt and is positioned at a minimum distance from the outer end of the arm to the end that it is not subjected to amplified vibration.

Another object of the invention is to provide a rear view mirror structure of the last mentioned type and character in which the free end of the cup-shaped outer washer is provided with a rearwardly flared frusto-conical flange which engages directly the apex portion of the hollow substantially hemispherical member and forms an extremely smooth sliding connection between it and said apex portion to the end that angular adjustment of the shell with respect to the arm may be readily obtained.

Another object of the invention is to provide a rear view mirror structure of the aforementioned character in which the head of the bolt is laterally enlarged in order that its periphery engages slidably the inner surface of the apex portion of the hollow substantially hemispherical member on the central portion of the crosswall of the shell and hence eliminates the necessity of employing a separate inner cup-shaped washer to coact with the outer cup-shaped washer.

A further object of the invention is to provide a rear view mirror structure of the type and character under consideration in which the front or headless end portion of the shank of the bolt of the universal joint, i. e., the portion that projects forwards beyond the outer end of the bracket-like arm, is screw threaded and has mounted thereon a clamp nut and a spring device which together serve to hold the bolt in connected relation with the outer end of the arm and also maintain the enlarged head of the bolt and the outer cup-shaped washer in clamped and straddled relation with the apex portion of the hollow substantially hemispherical member on the central portion of the shell crosswall.

A still further object of the invention is to provide a rear view mirror structure which is generally of new and improved construction, effectively and efficiently fulfills its intended purpose, is capable of being manufactured at a low or reasonable cost and possesses a comparatively long life.

Other objects of the invention and the various advantages and characteristics of the present rear view mirror structure will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a plan view showing a rear view mirror structure embodying the invention applied to the cab of an automotive truck;

Figure 2 is an enlarged fragmentary front view of the structure;

Figure 3 is a horizontal section taken on the line 3—3 of Figure 2 and illustrating in detail the construction and design of the exteriorly positioned universal joint whereby the one-piece stamped metal cup-shaped shell together with the mirror plate may be adjusted angularly to a limited extent relatively to the bracket-like arm;

Figure 4 is a composite view showing in perspective and separated relation the various component parts of the universal joint; and Figure 5 is a front view of the outer end of the bracket-like arm illustrating in detail the polygonal hole through which extends the polygonal head equipped end portion of the bolt of the universal joint.

The rear view mirror structure that is shown in the drawing constitutes the preferred form or embodiment of the invention. It is adapted to be located exteriorly of the cab of a truck or like vehicle and serves as a medium for permitting the truck driver or operator to view objects in back of the truck. As its principal components the structure comprises a bracket-like arm 6, a cup-shaped shell 7, a mirror plate 8 and a universal joint 9.

The bracket-like arm 6 serves as a mounting instrumentality for the other parts of the rear view mirror structure. It extends normally outwards from the cab of the truck and consists of inner and outer telescopically connected arm members 10 and 11 in order that its over-all length may be increased or decreased for purposes of properly positioning the mirror plate 8 with respect to the cab of the truck to which the structure as a whole is applied. The inner end of the inner arm member 10 of the arm is provided with a linkage arrangement 12 which serves to connect the arm to one of the door hinges on the cab of the truck and may be of standard design or construction or like that forming the subject matter of pending United States patent application Serial No. 143,238 filed by me on February 9, 1950 and entitled "Bracket Structure For Pivotally Supporting A Rear View Mirror Carrying Arm." It is contemplated that the linkage arrangement 12 will permit the arm 6 to be swung forwards and rearwards and also up and down. The outer end of the outer arm member 11 of the arm is flattened vertically and is provided with a square hole 13 as best shown in Figure 5 of the drawing.

The shell 7 of the rear view mirror structure is in the form of a one-piece sheet metal stamping and is preferably of circular configuration, although, if desired, it may be polygonal or oval. It serves as a housing and support for the mirror plate 8 and consists of a circular crosswall 14 and a cylindrical side wall 15. The crosswall 14 of the shell is imperforate throughout and is bulged forwards, i. e., in the direction of forward travel of the truck to which the rear view mirror structure is applied. The central portion of the shell crosswall 14 is flat. The cylindrical side wall 15 of the shell is connected to, and extends rearwards from, the outer marginal portion of the crosswall 14 and embodies on its rear or free margin a continuous inwardly extending flange 16.

The mirror plate 8 of the structure is in the form of a flat disc and consists of a circular piece of glass and an inner coating of suitable mirror forming material. It extends across the space within the cylindrical side wall 15 of the shell and constitutes a reflecting surface whereby the driver of the truck when looking towards it may see rearwards. The continuous inwardly extending flange 16 on the rear or free margin of the cylindrical side wall 15 of the shell 7 serves to hold the mirror plate in place. A ring 17 of rubber or other suitable resilient and elastic material is disposed within the interior of the shell 7. It is interposed between the adjacent marginal portions of the mirror plate 8 and the shell cross wall 14 and serves yieldingly to hold the marginal portion of the mirror plate in abutting relation with the inwardly extending flange 16.

The universal joint 9 of the rear view mirror structure extends between the central portion of the shell crosswall 14 and the outer end of the arm 6 and serves as a medium whereby the shell together with the mirror plate is permitted to be angularly adjusted to a limited extent so as to bring it within the range of vision of the driver of the truck. It is disposed wholly exteriorly of the shell 7 and comprises a hollow substantially hemispherical member 18, a bolt 19, an outer cup-shaped washer 20, a clamp nut 21 and a spring lock washer 22. The substantially hemispherical member 18 is in the form of a one-piece sheet metal stamping and is positioned directly in front of the flat central portion of the shell crosswall 14 and so that its apex portion extends or faces forwards. Said apex portion of the member 18 is provided with a comparatively large circular opening 23. The outer marginal portion of the member 18 is provided with an integral flat outwardly extending annular flange 24 and this fits directly against, and is welded to, the flat central portion of the shell crosswall 14 in order that the member 18 and the shell 7 are fixedly secured together. The bolt 19 of the universal point 9 is of one-piece character and consists of an elongated shank 25 and an enlarged head 26 at one end of the head. The end portion of the shank that has the head 26 connected to it is so far as cross section is concerned, square, the same in size as the square hole 13 in the outer end of the outer arm member 11 of the arm 6. The free or other end portion of the shank 25 is circular in cross section and has an external or male screw thread 27. As shown in Figure 3 of the drawing, the bolt 19 of the universal joint is arranged so that the square end portion extends through the circular opening 23 in the apex portion of the hollow member 18 and the head 26 is disposed within such member. The maximum transverse dimension of the square end portion of the shank of the bolt is materially less than the diameter of the opening 23 in order that the hollow member 18 together with the mirror plate equipped shell 17 is permitted to rock or tilt to a limited extent in different directions relatively to the bolt. The inner extremity of the square end portion of the shank, i. e., the portion that adjoins the extremity of the screw threaded end portion, fits within the aforementioned square hole 13 (see Figure 3). As a result of the particular shape of the hole 13 and the head end portion of the shank of the bolt 19 the bolt is positively held against rotation or turning movement relatively to the arm 6 of the rear view mirror structure. Instead of being square, the hole 13 and head end portion of the shank of the bolt may be pentagonal, hexagonal or any other shape, so long as they are noncircular and hence coact to hold the bolt against turning or rotation relatively to the arm. The head 26 of the bolt is circular as shown in Figure 4. It is of materially greater diameter than the circular opening 23 in the apex portion of the hollow substantially hemispherical member 18 and engages slidably the inner surface of the apex portion of said member. The outer cup-shaped washer 20 is disposed between the hollow substantially hemispherical member 18 and the outer end of the outer arm member 11 of the bracket-like arm 6. It is in the form of a one-piece sheet metal stamping and consists of a flat circular crosswall 28 and a cylindrical side wall 29. The crosswall 28 abuts directly against the rear surface of the flattened outer end of the outer arm member of the arm 6. It embodies in its central portion a square hole 30 which is the same in size as, and registers with, the square hole 13 and receives snugly but slidably the square head end portion of the shank 25 of the bolt 19. By reason of the fact that the hole 30 is square and corresponds in size to the square head end portion of the bolt shank the outer cup-shaped washer 20 is positively held against turning movement or rotation relatively to the bolt. The cylindrical side wall 29 of the washer is connected to, and projects rearwards from, the outer margin of the crosswall 28 and embodies at its rear margin an integral outwardly flared frusto-conical flange 31 which, as shown in Figure 3 of the drawing, fits slidably against the outer surface of the apex portion of the hollow member 18, i. e., the portion of the hollow member that defines and extends around the circular opening 23. By reason of the fact that the flange 31 is frusto-conical the sliding connection between it and the outer surface of the apex portion of the hollow member 18 is extremely smooth and hence angular adjustment of the shell 7 with respect to the outer end of the arm 6 may be readily obtained. The flange 31 of the outer cup-shaped washer 20 and the head 26 of the bolt 19 are in straddled relation with the apex portion of the hollow member 18 and coact therewith to permit the shell to be tilted or angularly adjusted into different positions with respect to the bolt 19 which is in fixed relation with the outer end of the arm 6. The screw threaded end portion of the shank 25 of the bolt projects forwards of the flattened outer end of the outer arm member 11 of the arm 6 and has mounted thereon the clamp nut 21. By reason of the fact that the shank of the bolt is positively held against turning movement with respect to the outer end of the arm 6 the nut 21 may be readily turned into and out of its operative position. The spring lock washer 22 surrounds the threaded end portion of the shank 25 of the bolt 19 and is interposed between the clamp nut 21 and the front side or surface of the flattened outer end of the outer arm member of the arm 6. It is concavo-convex and embodies internal teeth which when the clamp nut is in its operative or fully tightened position grip the inner end surface of the nut and tend to prevent reverse turning of the nut relatively to the bolt 19. As shown in Figure 3 and 4, the washer 22 is forwardly bowed or dished. As a result of this the lock washer, upon full tightening of the clamp nut, becomes partially flattened and exerts, through the medium of the nut, a forward spring action which tends to hold the head 26 of the bolt and the outer cup-shaped washer 20 in firm clamped rotation with the apex portion of the hollow substantially hemispherical member 18.

The herein described rear view mirror structure effectively and efficiently fulfills its intended purpose and is characterized by the fact that the universal joint thereof, due to the particular design and arrangement of its component parts, permits the desired amount of angular adjustment of the mirror plate equipped shell 7 while at the same time it does not subject the shell to amplified vibration in connection with normal vibration of the bracket-like arm during operation or drive of the automotive truck to which the structure as a whole is applied. The structure is further characterized by the fact that the particular universal joint embodies a minimum number of parts and possesses an extremely long life.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a rear view mirror structure adapted to be positioned on the outside of a vehicle and comprising an outwardly extending arm provided at its inner end with means for attachment to the vehicle and having in its outer end a horizontally and transversely extending polygonal hole, a cup-shaped shell disposed directly rearwards of the outer end of the arm, consisting of a crosswall and a continuous side wall, and having a mirror plate confined within its side wall, and an exteriorly disposed universal joint extending between the shell crosswall and the outer end of the arm, operative to support the shell together with the mirror plate for limited angular adjustment in different directions with respect to said arm, and embodying a hollow substantially hemispherical member disposed adjacent, and having the apex portion thereof projecting forwards from, the central portion of the shell crosswall, having an opening in its apex portion, and having its outer marginal portion connected fixedly to said central portion of the shell crosswall, a horizontal bolt consisting of a shank and an enlarged head on one end of the shank, extending loosely through the opening in said apex portion of the member, arranged so that its head is disposed within said member, having the head end portion of the shank thereof of the same polygonal cross sectional shape and size as the hole in the outer end of the arm and arranged so that its inner extremity fits within, and extends snugly but slidably through, said hole in the arm, and having the other end portion of its shank screw threaded and projecting forwards of the outer end of the arm, a one-piece sheet metal outer cup-shaped washer interposed between said hollow member and the outer end of the arm and consisting of a flat circular crosswall abutting directly against said outer end of the arm, provided in its central portion with a polygonal hole corresponding in shape and size to, and in registry with, the aforementioned hole and through which extends the snugly but slidably the central part of the head end portion of the shank of the bolt, and having its hole defining portion in such interlocked relation with said central part of the head end portion of the bolt shank that the washer is positively held against turning movement relatively to the bolt, and in addition a cylindrical side wall connected to, and projecting rearwards from, the outer margin of the washer crosswall and having its free rear margin bent outwards so as to form an outwardly and rearwardly flared frusto-conical flange that is in smooth sliding engagement with the outer surface of the apex portion of the hollow member, and a clamp nut on the threaded end portion of the shank of the bolt.

2. As a new article of manufacture, a rear view mirror structure adapted to be positioned on the outside of a vehicle and comprising an outwardly extending arm provided at its inner end with means for attachment to the vehicle and having in its outer end a horizontally and transversely extending polygonal hole, a cup-shaped shell disposed directly rearwards of the outer end of the arm, consisting of a crosswall, and a continuous side wall, and having a mirror plate confined within its side wall, and an exteriorly disposed universal joint extending between the shell crosswall and the outer end of the arm, operative to support the shell together with the mirror plate for limited angular adjustment in different directions with respect to said arm, and embodying a hollow, substantially hemispherical member disposed adjacent, and having the apex portion thereof projecting forwards from, the central portion of the shell crosswall, having an opening in its apex portion, and having its outer marginal portion connected fixedly to said central portion of the shell crosswall, a horizontal one-piece bolt consisting of a shank and an enlarged head on one end of the shank, extending loosely through the opening in said apex portion of the member, arranged so that its head is disposed within said member and engages slidably the inner surface of said apex portion, having the head end portion of the shank thereof of the same polygonal cross sectional shape and size as the hole in the outer end of the arm and arranged so that its inner extremity fits within, and extends snugly but slidably through, said hole in the arm, and having the other end portion of its shank screw threaded and projecting forwards of the outer end of the arm, a one-piece sheet metal outer cup-shaped washer interposed between said hollow member and the outer end of the arm and consisting of a flat crosswall abutting directly against said outer end of the arm, provided in its central portion with a polygonal hole corresponding in shape and size to, and in registry with, the aforementioned hole and through which extends the inner extremity of the head end portion of the shank of the bolt, and having its hole defining portion in such interlocked relation with said central part of the head end portion of the bolt shank that the washer is positively held against turning movement relatively to the bolt, and in addition a cylindrical side wall connected to, and projecting rearwards from, the outer margin of the washer crosswall and having its free rear margin bent outwards so as to form an outwardly and rearwardly flared frusto-conical flange that is in smooth sliding engagement with the outer surface of the apex portion of the hollow member, a clamp nut on the threaded end portion of the shank of the bolt, and a spring lock washer extending around the last mentioned portion of the shank of the bolt and interposed between the clamp nut and the outer end of the arm.

FRANCES BUDRECK.

References Cited in the file of this patent

UNITED STATES PATENTS

| Number | Name | Date |
|---|---|---|
| 1,446,164 | D'Eyraud | Feb. 20, 1923 |
| 1,844,675 | Oisher et al. | Feb. 9, 1932 |
| 1,863,060 | Knutson | June 14, 1932 |
| 1,909,526 | Falge et al. | May 16, 1933 |
| 2,113,251 | Dover | Apr. 5, 1938 |
| 2,248,833 | Thibault et al. | July 8, 1941 |
| 2,465,751 | Robins | Mar. 29, 1949 |

FOREIGN PATENTS

| Number | Country | Date |
|---|---|---|
| 486,346 | Great Britain | June 2, 1938 |